Sheet 1 - 2 Sheets.

Willard & Ross.
Mower.

Nº 18562  Patented Nov. 3, 1857.

Sheet-2-2Sheets.

Willard & Ross.
Mower.

Nº 18562      Patented Nov. 3, 1857.

UNITED STATES PATENT OFFICE.

HOSEA WILLARD AND ROBERT ROSS, OF VERGENNES, VERMONT.

IMPROVEMENT IN HARVESTERS.

Specification forming part of Letters Patent No. 18,562, dated November 3, 1857.

*To all whom it may concern:*

Be it known that we, HOSEA WILLARD and ROBERT ROSS, both of Vergennes, in the county of Addison and State of Vermont, have invented a new Improved Grain and Grass Harvesting Machine; and we do hereby declare that the following is a full, clear, and exact description of the same, reference being had to the annexed drawings, making part of this specification, in which—

Figure 1:
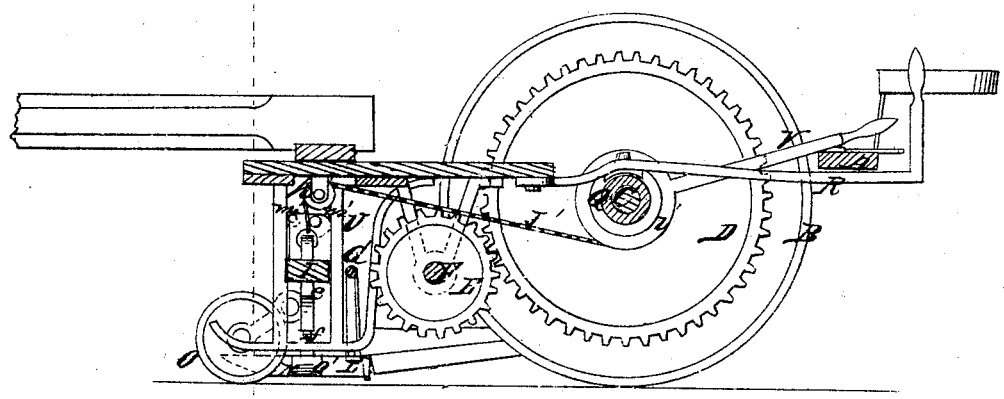
Figure 3:
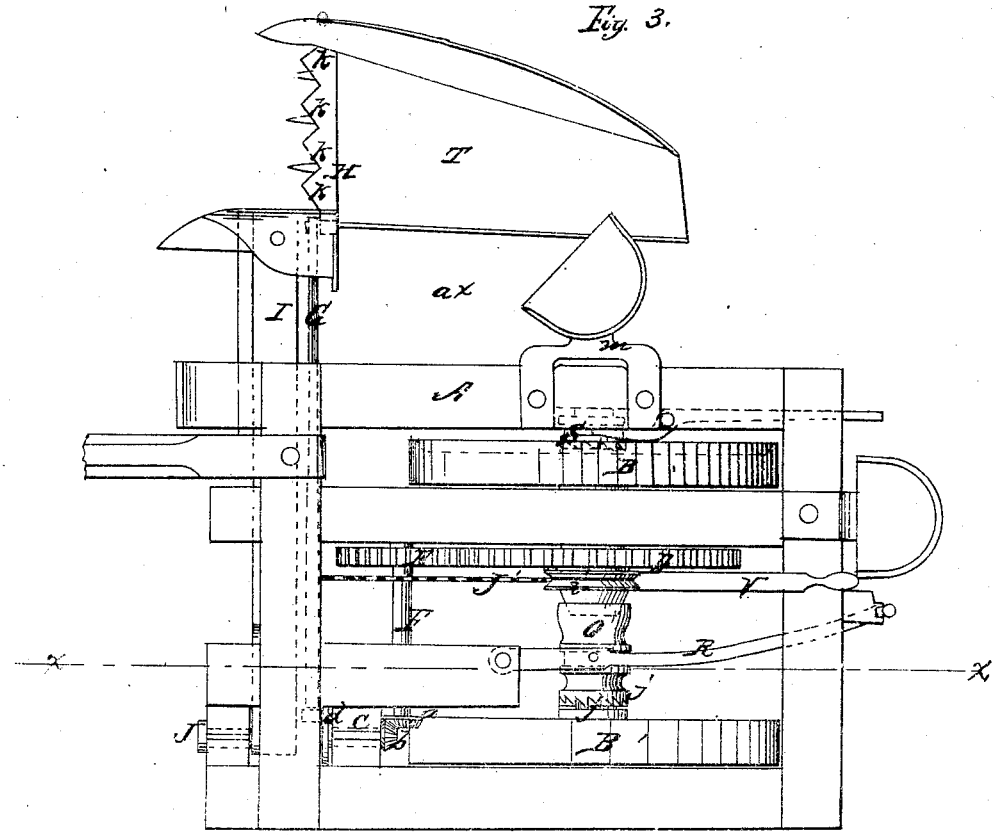
Figure 2:
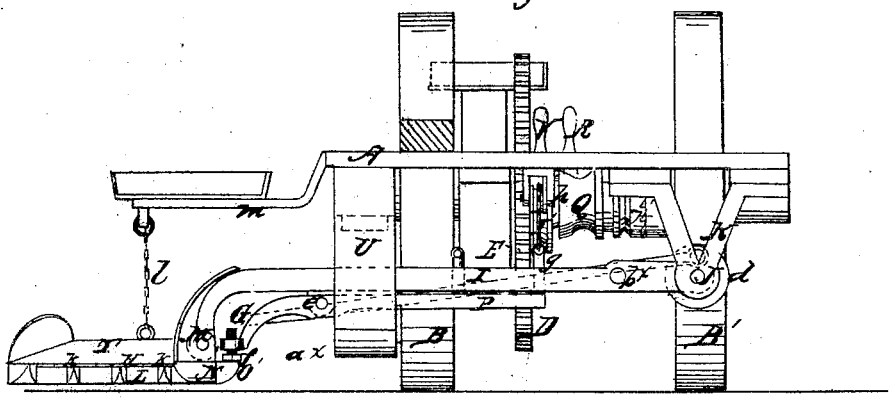

Figure 1 is a side sectional elevation of our improvement, taken in the line $x\ x$ in Fig. 3. Fig. 2 is a front view of the same. Fig. 3 is a plan or top view of the same.

Similar letters of reference indicate like parts in the three figures.

This invention consists in a peculiar mode of attaching the cutting device to the machine, so that the cutting device may be allowed to yield or "give" to correspond to the inequalities of the surface of the ground, and also permitted to be raised bodily at the will of the operator, in order that it may pass over obstructions, and also be free from the ground when not in use and the machine is being moved from place to place.

To enable those skilled in the art to fully understand and construct our invention, we will proceed to describe it.

A represents a horizontal rectangular frame, which may be constructed of metal or wood and supported by two wheels, B B', which are placed loosely on a shaft or axle, C, which is fitted in suitable bearings attached to the under side of the frame. On the shaft or axle C a toothed wheel, D, is permanently attached. The said wheel D gears into a pinion, E, which is placed on a shaft, F, in the frame A; and the outer end of shaft F has a bevel-pinion, $a$, upon it, said pinion gearing into a corresponding pinion, $b$, which is placed at one end of a small shaft fitted in a bearing, $c$, and having a crank-wheel, $d$, at its opposite end. To the crank-wheel $d$ one end of a connecting-rod, G, is attached, the opposite end being connected to the sickle-bar H.

I is a bar, the outer end of which is fitted on a pivot, J, which passes through a pendant, K, attached to frame A. The inner or opposite end of this bar is curved or bent downward, and the finger-bar L is attached to it by a joint, M, said joint being formed at the upper part of a shoe, N, at the inner end of the finger-bar, as seen in Fig. 2. The inner end of the bar I, adjoining the finger-bar L, is supported by a wheel, O, which may be adjusted vertically, so as to keep the finger-bar at the desired height, said wheel O also serving to diminish side draft. The inner side of the shoe N has a projection, O', formed on it; and P is a lever, which is pivoted to the under side of the bar I, as shown at $e$. The inner end of this lever is curved downward, and has a set-screw, $f$, passing through it, said screw being directly over the projection O' of the shoe N. The outer end of the lever P has an upright pin, $g$, formed on it, said pin passing through the bar I, and having a cord or chain, J, attached to it, the cord or chain passing over a sheave, $h$, and being attached to a pulley, $i$, which is placed loosely on the axle C, the pulley being connected with the axle, so as to turn with it, when desired, by means of a clutch, Q, which is operated by a lever, R. The clutch is constructed in the usual way, it being merely a sliding hub placed on the axle C and connected with it by a feather and groove. One end of the hub has a taper-opening made in it, and fits over a conical or taper projection on one side of the pulley. The opposite end of the hub has ratchet-teeth $j$ formed on it, either of which may act against a tooth projection, $j'$, on the hub of the wheel B', and connect it with the axle when necessary. The other wheel, B, is connected with the axle by a separate or independent clutch, S. The finger-bar L is of the usual construction, as also is the sickle, the usual saw-shaped teeth, $k$, being attached to the bar H, which is allowed to work back and forth on the finger-bar.

T is the platform, the front end of which is attached to the finger-bar L, and the back end is suspended by a chain, $l$, from a bar, $m$, attached to the frame A.

The operation is as follows: As the machine is drawn along, the sickle is operated by the rod G, crank-wheel $d$, and gearing D E; and as the finger-bar L is attached to the bar I by the joint M, and the outer end of the bar I is allowed to work freely on the pin or pivot J, it will be seen that the cutter-bar, and consequently the sickle, will be allowed to conform to the inequalities of the surface of the ground, for either end of the cutter-bar may be raised separately or both ends may be raised at once, according to the undulations of the ground. In case, however, the finger-bar is to be raised bodily—that is, horizontally upward—in order to pass over an obstruction of any kind, it will be seen that the finger-bar, in consequence of its joint-connection with the bar I, will require support. This is obtained by the lever P, which, when its outer end is raised, has the set-screw $f$ at its inner end pressed down upon the projection O' of the shoe N. The bar I is raised by actuating the clutch Q, so as to connect the pulley $i$ with the axle C, the said pulley, as it rotates, winding up the cord or chain J and raising the bar I and the outer end of the lever P. The bar I works in a pendent guide, U, attached to the frame A, and the said bar has friction-rollers $m'$ attached to it to diminish friction between the bar and guide.

When the machine is used as a grain-harvester the bar I is adjusted outward from the frame A, as shown clearly in Figs. 2 and 3, so as to allow a space, $a^{\times}$, between the inner edge of the platform and frame A, for the grain to be raked off. In this case the pivot J is placed through the extreme end of bar I. When, however, the machine is to be used as a grass-harvester the pivot J is placed through a hole, $b^{\times}$, at some distance from the outer end of said bar, and by this means the inner end of the cutter-bar is brought near the side of the frame A. In cutting grass the finger-bar, or, rather, its shoes, rests upon the surface of the ground; but in cutting grain the finger-bar is elevated by adjusting the wheel O. In the latter case the sickle-bar H is kept in a horizontal position by the lever P, and as the cutter is always raised comparatively high in cutting grain it is not liable to come in contact with the ground, even if it be very undulating, and therefore the self-adjusting movement of the finger-bar is not necessary.

By having the two wheels placed loosely on the axle and connected thereto by clutches the machine may be readily turned by disconnecting the outermost clutch from the axle.

We would remark that the pulley $i$ may be turned by hand, when desired, by having a handle or lever, V, attached to it.

We do not claim broadly attaching the finger-bar to the machine by a joint, for this has been previously done; but

What we claim, and desire to secure by Letters Patent, is—

1. The combination of the hinged finger-bar L with the adjustable bar I, lever P, regulating set-screw $f$, and wheel O, the whole being constructed and arranged in relation to the main frame for joint operation in the manner and for the purpose above set forth.

2. Lever P and regulating set-screws $f$, in combination with bar I, chain or cord J', pulley $i$, and clutch Q, for the purpose of raising the hinged finger-bar L, as described.

HOSEA WILLARD.
ROBERT ROSS.

Witnesses for Mr. H. Willard:
W. TUSCH,
WM. HAUFF.
Witnesses for R. Ross:
IRA BINGHAM,
H. G. JUDD.